United States Patent

Toet

[15] 3,706,187
[45] Dec. 19, 1972

[54] HARVESTING MACHINE ESPECIALLY FOR TREE FRUITS

[72] Inventor: Gary M. Toet, 1470 Wendell Way, Yuba City, Calif. 95991

[22] Filed: Sept. 2, 1971

[21] Appl. No.: 177,248

[52] U.S. Cl. ................................................. 56/329
[51] Int. Cl. ........................................... A01g 19/06
[58] Field of Search ........................... 56/329, 328 TS

[56] References Cited

UNITED STATES PATENTS

| | | | |
|---|---|---|---|
| 3,145,521 | 8/1964 | Herbst | 56/329 |
| 3,623,308 | 11/1971 | Nye | 56/329 X |

*Primary Examiner*—Louis G. Mancene
*Assistant Examiner*—J. N. Eskovitz
*Attorney*—Marcus Lothrop et al.

[57] ABSTRACT

A harvesting machine especially for tree fruits has a mobile carriage including a main frame adapted to be driven alongside a tree trunk so that a shaker on the frame can engage the trunk. The main frame is adapted to pick up, hold and discharge a fruit bulk bin. A catching frame overlies the main frame and extends under one side of the tree branches. A pair of subframes are swung on pivots on the main frame from retracted position to extended position on opposite sides of the tree trunk. Support arms pivotally mounted on the subframes carry flexible catching wings adapted to supplement the catching frame and to extend from retracted position to extended position underlying the remaining branches of the tree. Fruit falling onto the catching frame and catching wings when the shaker operates is led to a conveyor system carrying the fruit to the bulk bin.

29 Claims, 14 Drawing Figures

PATENTED DEC 19 1972

INVENTOR.
GARY M. TOET
BY Lothrop & West
ATTORNEYS

INVENTOR.
GARY M. TOET
BY Lothrop & West
ATTORNEYS

HARVESTING MACHINE ESPECIALLY FOR TREE FRUITS

In recent years harvest of tree fruits has often included a means for shaking the limbs or the trunk of a tree bearing ripening fruit with sufficient force to dislodge the fruit from the tree so that the fruit falls and the entire picking operation is accomplished in a matter of seconds or minutes. Various means are sometimes provided for catching the fruit before the fruit actually hits the ground. Often this involves the provision of some flexible sheeting disposed on the ground or on travelling frames adapted to move along both sides of a row of tree trunks and to stop in registry on opposite sides of the trunk underneath a tree to be shaken. This technique involves the use of a pair of carriages, separate propulsion units for each carriage, and a pair of operators to guide and position the catchers in location beneath the active tree. The system also involves some means for gathering the fruit after it has been intercepted by the catchers and ultimately delivering it to bulk bins for transport to a cannery or storage. All of this involves considerable machinery and a number of operators.

It is therefore an object of my invention to provide a harvesting machine generally useful but especially for use with tree fruit in which but a single vehicle or carriage is effective not only to transport the shaker to a tree but likewise completely to underlie the tree, surrounding the trunk so that the tree need be approached from but one side.

Another object of the invention is to provide an almost completely automatic mechanism so that a single catching mechanism is extended beneath the tree, the tree is shaken, the falling fruit is intercepted and transported to a bulk bin which has already been picked up by the mechanism, the catching mechanism is retracted at the conclusion of the operation, and the bulk bin is discharged when it is full.

Another object of the invention is to provide means for economically setting up a shaking, catching and fruit holding mechanism utilizing but a single carriage and but a single operator.

Another object of the invention is in general to provide an improved machine for shaking, intercepting and transporting fruit from a tree.

Another object of the invention is to provide a harvesting machine that can easily be operated in the customary fruit orchard without substantial interference with the trees.

Another object of the invention is to provide a single harvesting machine that can be utilized to intercept fruit from all sides of a tree simultaneously.

Another object of the invention is to provide a harvesting machine in which the extension and retraction of the fruit intercepting mechanism is accomplished by power and semiautomatically.

A further object of the invention is to provide a harvesting machine effective in addition to its other capabilities to pick up bulk fruit bins for use in the machine and for discharging them.

Other objects of the invention together with the foregoing are attained in the embodiment of the invention described in the accompanying description and illustrated in the accompanying drawings, in which.

Figure 4:
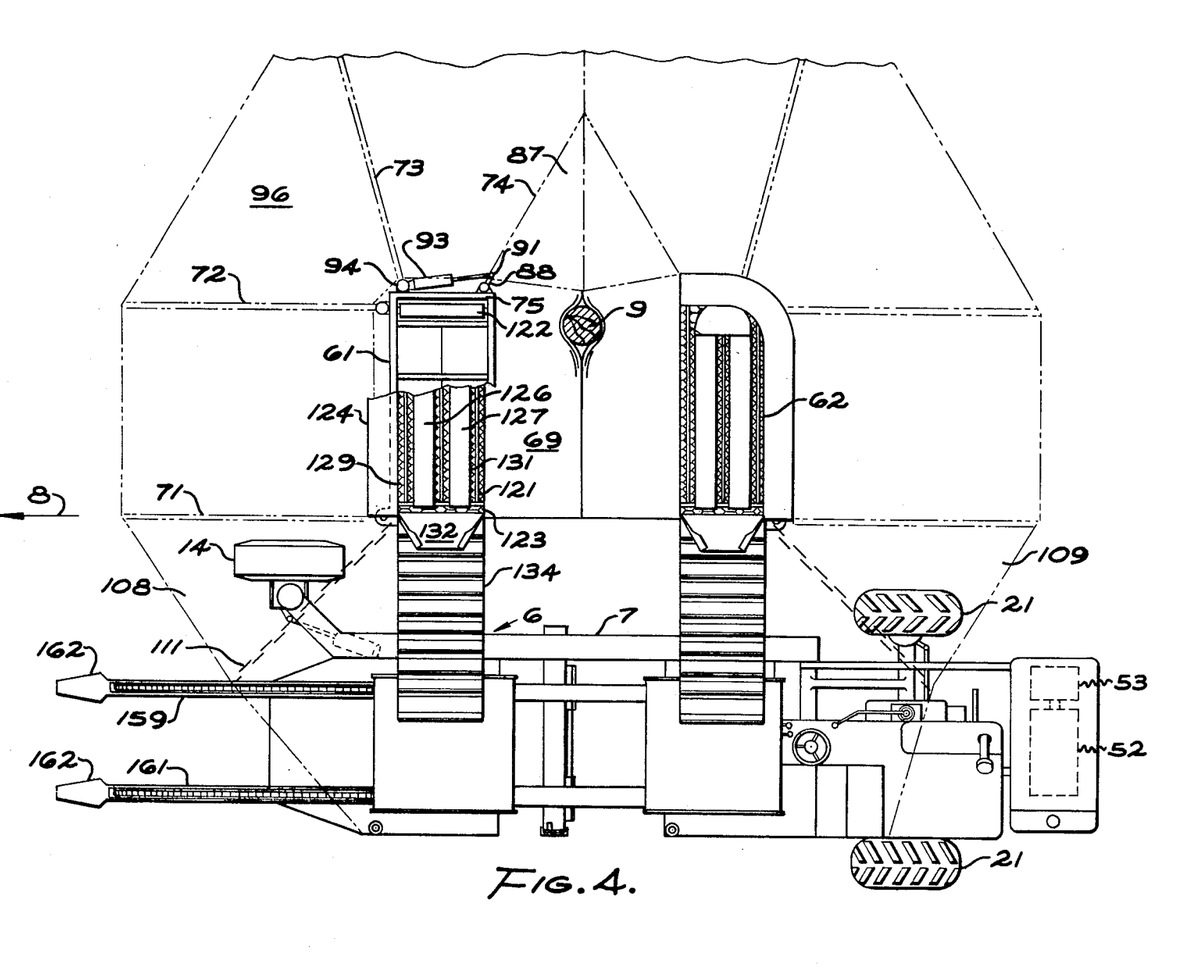
FIG. 4 is a view similar to FIG. 3 but to an enlarged scale and with various portions of the mechanism being omitted to disclose the interior constructions.
Figure 5:
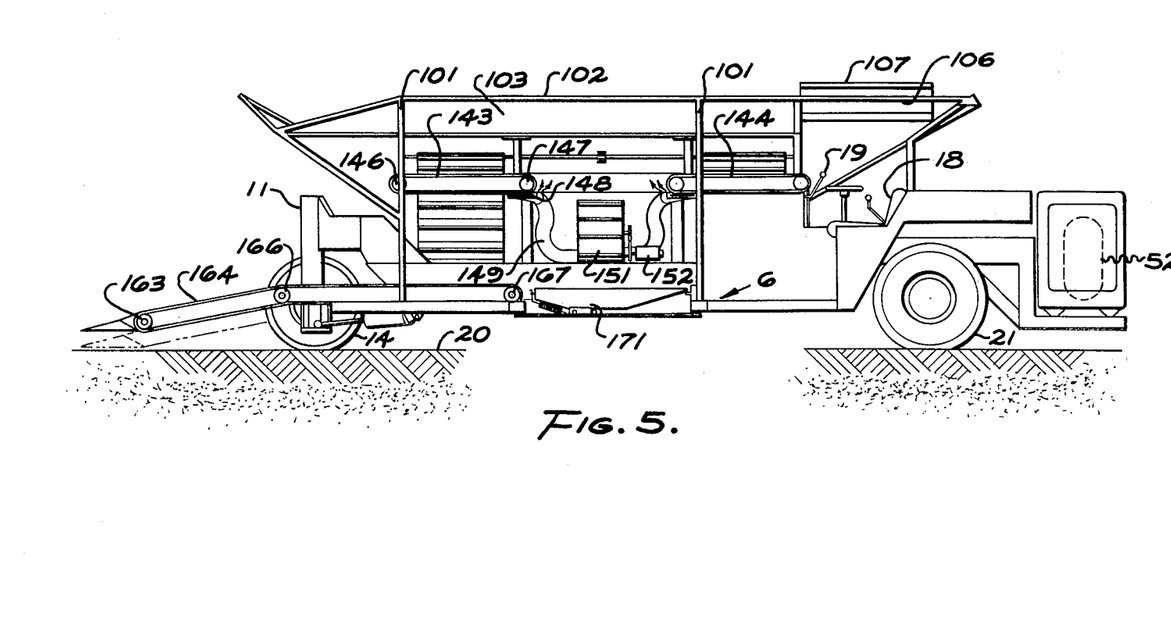
FIG. 5 is a side elevation of the machine as disclosed in FIG. 4.

In the usual form of the harvester there is included a carriage 6 having a main frame 7 and mobile generally in a direction of advance as indicated by an arrow 8 in FIG. 4 to be disposed alongside of a trunk 9 for a tree. The tree branches and foliage extend generally radially from and above the trunk 9 in an approximately circular pattern. The trunk is usually one of a series of tree trunks arranged in a line extending in the direction 8. As part of the carriage 6 the main frame 7 at its offset forward end has a hydraulic cylinder 11 disposed on a vertical axis. Within the cylinder a piston 12 is rotatable and also vertically reciprocable. The piston at its lower end carries a bracket mounting 13 on which a front, ground-engaging, dirigible wheel 14 is mounted. The hydraulic cylinder mechanism supports and steers the front end of the vehicle or carriage.

The bracket mounting 13 is connected by a hydraulic jack mechanism 16 to a bracket 17 on the main frame 7. The operator at a station 18 on the main frame 7 is provided with controls 19 (diagrammatically illustrated), with one of which he can introduce hydraulic fluid to the cylinder 11 or withdraw fluid therefrom in order to vary the height of the forward end of the main frame 7 with respect to the ground 20. By another of the controls 19 the operator can introduce and withdraw hydraulic fluid from the jack 16, so that the dirigible front wheel 14 is properly steered in order to guide the front end of the vehicle.

The carriage 6 at the rearward end of the main frame 7 is also supported on a pair of rear ground-engaging wheels 21 (FIGS. 9 and 10) joined through a pair of universal ball joints 22 to an axle 23. A pair of parallel, radial struts 24 connect the axle 23 to a cross tube 26 mounted in journal brackets 27 on a cross member 28 of the main frame 7 for vertical, swinging motion about a transverse, horizontal axis. The position or height of the rear portion of the main frame 7 with respect to the axle 23 is governed by a hydraulic jack 31 at the cylinder end connected to an outrigger 32 on the main frame cross member 28 and at the piston rod end connected to one of the struts 24. By varying the amount of hydraulic fluid in the jack 31, the operator can lift or lower the rear end of the main frame 7 with respect to the ground 20.

Figure 9:
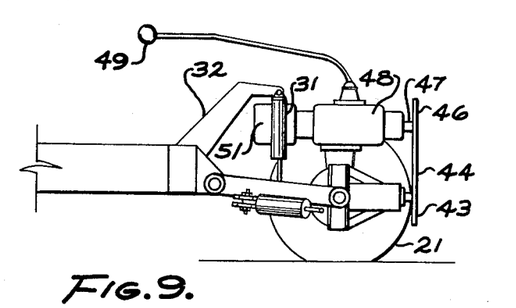
FIG. 9 is a side elevation of the rear propulsion and steering portion of the carriage, many parts being omitted for clarity and the view being a section on a longitudinal vertical plane just inside one of the rear wheels.
Figure 10:
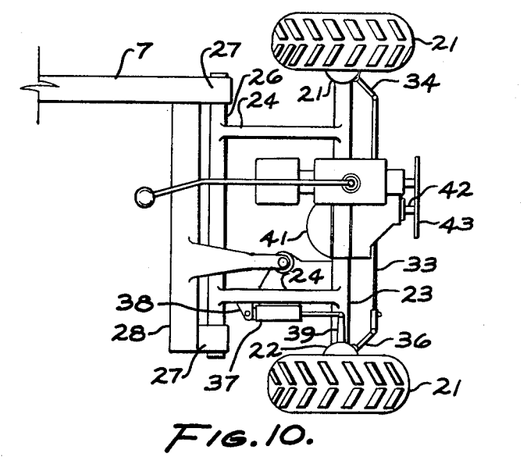
FIG. 10 is a plan of the mechanism shown in FIG. 9 with substantially the same omissions.
Figure 11:
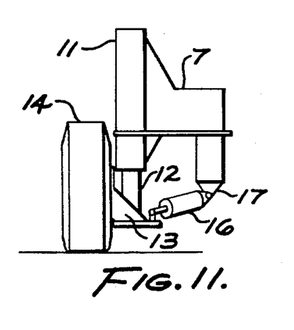
FIG. 11 is a front elevation of the steering front wheel of the device, various portions being omitted for clarity.
Figure 12:
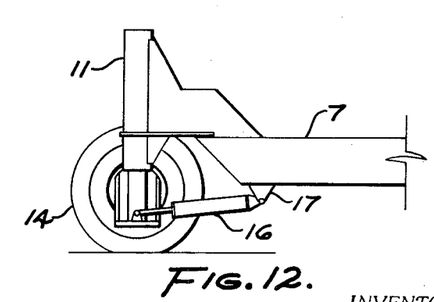
FIG. 12 is a side elevation of the structure shown in FIG. 11 with the same omissions.

The rear wheels 21 are also dirigible about the centers of the respective ball joints 22 and are connected for Ackermann steering by a tie rod 33 joined to steering arms 34 and 36 governing steering or pivotal rotation of the ball joints 22. The steering is controlled by the operator through one of the controls 19 affecting a hydraulic jack 37 at one end connected to a bracket 38 on one of the struts 24 and at the other end connected to a steering arm 39 joined to the adjacent ball joint mechanism in the customary way. With this structure the operator at his option can raise and lower the rear end of the main frame and can likewise steer the rear wheels.

The axle 23 also incorporates a differential gear drive mechanism 41 of the usual sort having a pinion shaft 42 extending rearwardly and carrying a sprocket 43. A chain 44 is trained around the sprocket 43 and also around a sprocket 46 on the output shaft 47 of a change gear transmission 48 having a hand control 49 accessible to the operator. Power for the transmission 48 is provided by a hydraulic motor 51 connected thereto, the motor 51 and transmission 48 and appurtenant structures being supported on the axle 23. Thus, when the hydraulic motor 51 is energized by the operator either in the forward or in the reverse direction, and when an appropriate gear ratio is chosen in the transmission 48, the rear wheels 21 are driven forwardly or rearwardly at the operator's option as to the desired speed and power output.

Power is supplied by an internal combustion engine 52 supported on an overhung portion of the main frame to the rear of the wheels 21 and driving a hydraulic pump 53 connected through the several operator controls 19 to various driven elements on the vehicle, including the various hydraulic jacks as well as the hydraulic propulsion motor 51.

With the mechanism as described, the operator can maneuver the vehicle by steering either the front wheel alone or both of the rear wheels alone. He may turn them in the same or in opposite directions and can operate the vehicle either forwardly or rearwardly in order that it can be maneuvered well in an orchard and close to the tree trunks. He likewise can raise and lower the main frame bodily by simultaneously operating both of the hydraulic devices 11 and 31, or he can raise or lower either end of the vehicle individually. The main frame can be disposed either at a general level or horizontal attitude or can be pitched down in the front or pitched down in the rear. Conveniently, all of the operator's controls are arranged in the vicinity of the operator's station 18, conveniently disposed on the main frame just ahead of one of the rear wheels 21 and preferably at one side of the vehicle.

Figure 1:
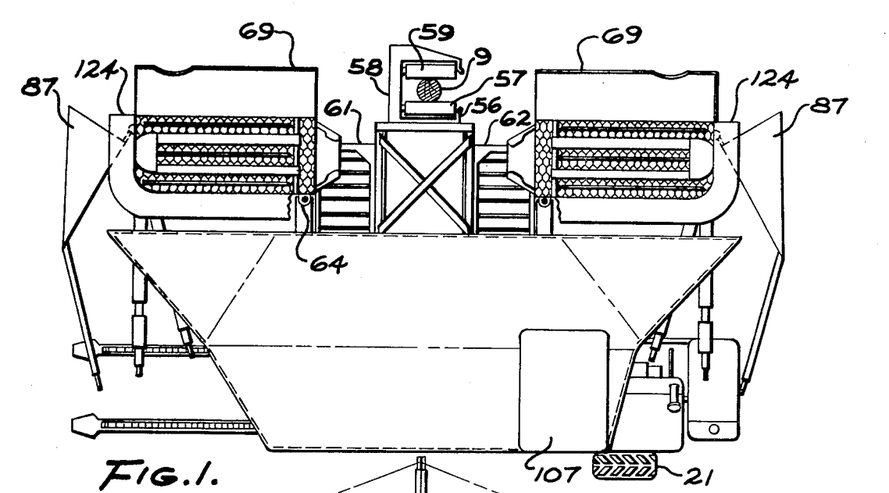
FIG. 1 is a plan of a harvesting machine constructed pursuant to the invention shown in its retracted condition with certain portions of the mechanism being omitted to improve the clarity of the disclosure.
Figure 2:
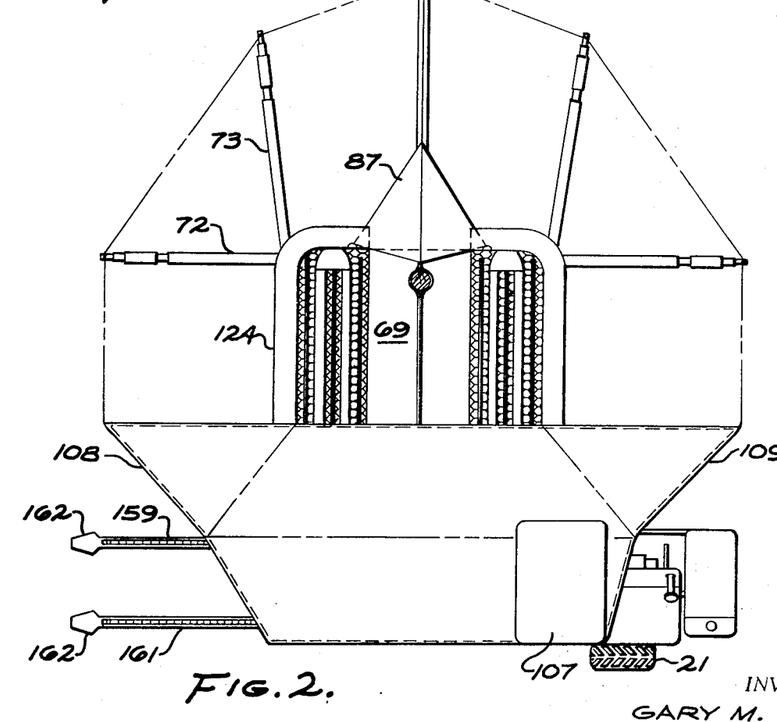
FIG. 2 is a view similar to FIG. 1 but with the machine in an extended position, again certain parts having been omitted for clarity.
Figure 3:
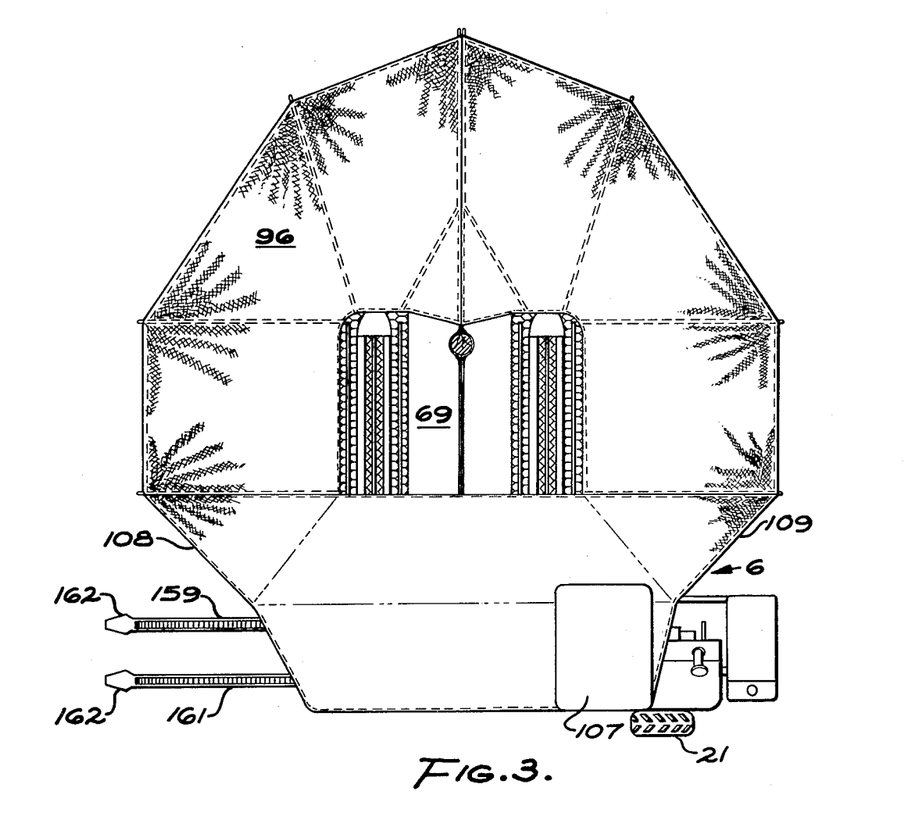
FIG. 3 is a view similar to FIG. 2 but showing the catching wing covers in place.

By manipulating the various controls available to him, the operator can drive the carriage from a distant point to the orchard in which the trees are disposed and then by going down a tree row in the direction of the arrow 8, or partially in that direction, can maneuver the carriage to a location alongside a selected tree trunk 9, as illustrated in FIG. 4. When the vehicle is substantially centralized close to the tree trunk 9, the operator by working the controls positions a hydraulically actuated tree shaker, generally designated 56, in shaking engagement with the tree trunk. The shaker 56 is a standard article of commerce as shown in U.S. Pat. No. 3,457,712. It includes an inboard padded jaw 57 adapted to align against and abut one side of the trunk 9 and also includes a swinging jaw 58. When inactive, the jaw 58 is retracted inboard of the jaw 57 but is hydraulically rotated and swung out from its retracted position into an active, projected position, as shown in FIG. 1. The padded jaw 58 is aligned to face the jaw 57 and against the opposite side of the trunk 9. The shaker in this position is clamped in firm engagement with the tree trunk and when energized is effective to produce a violent shaking motion of the trunk which in turn shakes the remainder of the tree.

About the time the tree shaker is being engaged with the tree trunk, but before the shaker is energized to perform its shaking function, the operator also operates controls substantially simultaneously to move into position a pair of subframes 61 and 62. These are substantially alike except for symmetry, so that a description of one applies to the other. The two subframes are utilized together in the operation of the structure. Normally the subframes are in retracted position, as shown particularly in FIG. 1, for transport of the vehicle in order that it will be sufficiently compact to journey along the road and in the aisles in an orchard without interfering with the branches or having difficulty in maneuvering.

Figure 6:
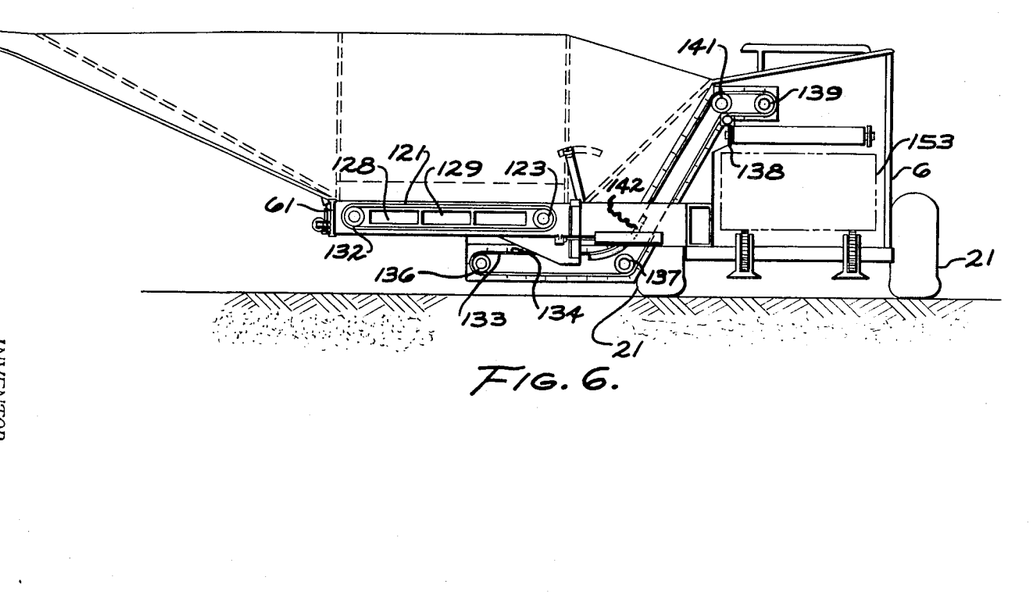
FIG. 6 is a front elevation of the machine as shown in FIG. 4.
Figure 7:
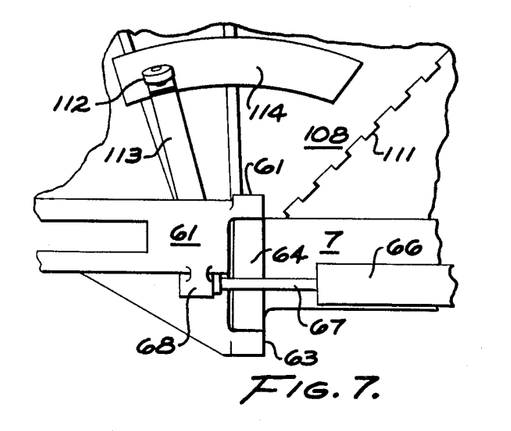
FIG. 7 is an enlarged detail of a portion of the machine shown in FIG. 6 illustrating the subframe moving mechanism and a panel camming mechanism.

As particularly shown in FIGS. 4, 6 and 7, the subframe 61 is typically related to the main frame 7 through a hinge connection including a hinge fork 63 on the subframe and a hinge boss 64 on the main frame 7, the parts being connected for rotation about a vertical axis. The swinging motion of the subframe relative to the main frame is effected by a hydraulic jack 66 articulated to the main frame 7 and carrying a piston rod 67 having an articulation 68 joined to the subframe 61. When the jack 66 is appropriately controlled, the subframe 61 is swung through approximately ninety degrees from its retracted position extending with its longitudinal dimension approximately fore and aft in the direction of the arrow 8 to its extended or projected position in which the subframe is approximately at right angles to the length of the main frame 7.

While both the subframes 61 and 62 when extended are spaced some distance from the trunk 9, partly to account for different trunk sizes and shapes, each subframe carries a platform 69 of a generally resilient or yielding material extending outwardly from the subframe. Even when the subframes are retracted, the platforms 69 can brush against tree trunks, limbs or the like and simply yield without damage. When the subframes are in active, extended position, the two platforms 69 come into resilient abutment, closing any gap therebetween except immediately around the trunk 9. The two platforms make a close contact with the trunk, so that there are no large openings between the harvesting machine and the tree trunk.

Figure 8:
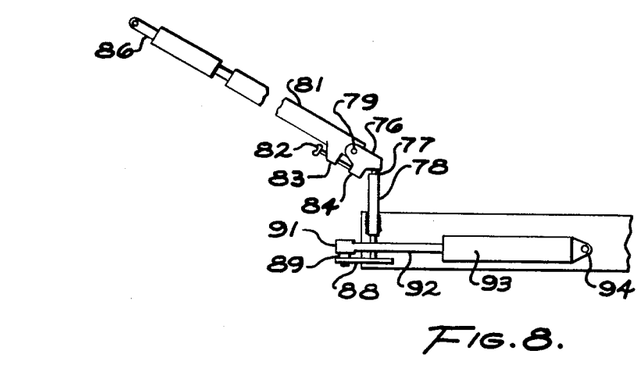
FIG. 8 is an end view of one of the subframes and its associated mechanism.

Each of the subframes carries a number of support arms 71, 72, 73 and 74, each of which, as particularly shown in FIG. 8, preferably includes a base member 76 mounted at the upper end of a spindle 77 rotatable in a tubular housing 78 secured to the subframe. The base member 76 has a cross pin 79 interrelating a tube 81 to the base member 76 for rotation about the horizontal axis of the pin 79, the particular angular or sloped position of the tube 81 being adjustable by a screw 82 extending through a lug 83 on the tube 81 and abutting against a lug 84 in the base member 76. The angle of the arm 81 can be adjusted with respect to the axis of the tube 78, about which the arm 81 can readily rotate. Projecting from the upper end of the tubular lower portion of each arm is a telescoping extension rod 85 so that the length or radial extent of each arm can be controlled.

The arm 74 at the leading end or corner of the cross member 86 of the subframe is mechanically rotated. This arm when seen in plan is offset and carries a triangular closure plate 87 to abut a symmetrical plate on the other half of the machine. In order that the arm 74 can be rotated, the spindle 77 is extended downwardly and carries a crank arm 88 having a pin 89 engaged with a socket 91 on a piston rod 92 reciprocable within a cylinder 93 having a ball connection 94 to the frame member 86. When the piston rod 92 is hydraulically moved out of the cylinder 93, the support arm 74 is moved out into the position illustrated in FIG. 4, but when the piston rod 92 is moved into the cylinder 93, the support arm 74 is pulled inwardly so that it lies substantially parallel to the cross member 86.

Motion of the support arm 74 is utilized to deploy or position the other support arms 72 and 73. Some support arms may not be made rotatable, but it is preferred that at least the leading ones be rotatable. The motion of the other, rotatable arms is accomplished by the cylinder mechanism 93, since all the support arms on each subframe are interconnected by an overlying flexible sheet 96 which is substantially coextensive with the envelope figure described by the various arms when extended. The sheet or wing is connected to the arms by appropriate pocketing or fastenings not shown. The wing material is highly flexible and is relatively continuous so far as the fruit to be caught are concerned; that is, the fabric is either a continuous film or is closely woven net or mesh; for example, it is duck or canvas. Since the fabric is connected to all of the support arms on the related subframe, when the support arm 74 is moved out or extended the fabric is pulled along with it from a folded condition. Similarly, as the fabric between the various support arms is sufficiently tightened, it pulls the trailing support arms with it about the axes of their various support rods 77. In this fashion the catching wings made up of the support arms and the fabric are deployed into an extended position to underlie a substantial portion of the tree branches.

When the piston rod is retracted, then the support arm 74 in moving counterclockwise, as seen in FIG. 4, permits the fabric to relax and to flex. Eventually the support arm 74 comes into physical contact with the support arm 73 and moves that support arm in a counterclockwise direction also, permitting that arm to swing against the arm 72 with folding or collapse of the intervening fabric. Finally the various arms are stowed generally in the direction of the arm 71 and of the main frame and with folded fabric between the arms and with the entire catching wing in its retracted position.

For the fruit intercepting operation and when the subframes swing out, the support arms are carried accordingly, and when the jack 93 is actuated the wing on one side of the trunk is extended into the position shown in FIG. 4, and similarly and by symmetrical operation the similar wing in connection with the subframe 62 is likewise extended. Much of the area beneath the tree is thus underlain by the intercepting wings extended from one side of the tree trunk.

To complete the interception mechanism beneath the tree branches, the main frame has a number of stanchions 101 included in a light, stationary superstructure 102 overlying the operator's station 18 and much of the remaining part of the main frame. The superstructure is relatively high along the longitudinal side edge of the machine and slopes inwardly and downwardly across the main frame and toward the subframes 61 and 62. The superstructure 102 is in itself a catching frame covered with a fabric sheet 103 and has various inclinations leading generally downwardly and inwardly toward the tree trunk 9. This portion of the intercepting mechanism, in plan as seen in FIG. 4, is approximately an elongated hexagon. There is a hatch opening 106 in a part of the catching frame covered by a sloped but raised hatch cover 107 adequately padded so that the operator has ports through which to view the operation but without substantially interrupting the continuity of the catching frame.

To supplement the stationary portions of the catching frame and to merge well with the two movable catching wings, there is provided a pair of movable panels 108 and 109 at appropriate angles. Each panel is preferably a rigid, padded plate connected to the catching frame on a diagonal line by means of a piano hinge 111. The description of one side applies to the other since they are symmetrical. The panel 108, for example, as particularly shown in FIG. 7, is supported along one edge by the hinge 111 and is otherwise supported on a cam roller 112 at the upper end of an arm 113 upstanding at an angle from the subframe 61. The roller 112 bears against a wear plate 114 on the nether side of the hinged panel 108.

When the subframe 61 is in its retracted position, the cam roller 112 is adjacent the piano hinge 111 and the panel 108 is held by gravity in a lower position. It is well retracted and generally out of the way. However, when the roller 112 swings outwardly as the subframe swings outwardly, the roller 112 moves from the right-hand end of the wear plate 114 in FIG. 7 toward the left-hand end thereof. This motion lifts the panel 108 by rotating it about the inclined piano hinge 111. In the new position the lifted panel 108 forms not only a continuation of the catching frame 102, but likewise forms a close relationship with the support arm 71. In effect there is continuity between all of the various catching surfaces underlying the tree. All of those surfaces incline toward the tree trunk in a radially inward and downward direction. Any fruit falling upon any portion of the catching wings, the catching panels or the catching frame is gently intercepted and is directed to continue by gravity down toward the tree trunk itself.

When the subframes and wings have all been deployed as indicated, the tree shaker 56 is then energized to shake the trunk 9. All of the fruit on the tree that can be detached in that fashion then falls downwardly, being intercepted by the catching mechanism underlying the tree.

Each of the subframes is like the other, and each carries a conveyor belt 121 of openwork mesh wire construction trained around an outboard drum 122 at the outboard end of the subframe and around another drum 123 at the inboard end of the subframe. The inboard drum 123 is preferably rotated by a hydraulic motor on its shaft (not shown). The net result is that the upper run of the conveyor 121 is moved toward the main frame of the machine. Since the material of the conveyor might injure fruit falling directly thereon, I provide protecting devices. Overlying parts of the subframe in addition to the soft, sloping platforms 69 are rubber pads 124 along the sides and ends as well as rubber cushions 126 and 127 spaced apart to permit fruit to pass therebetween but nevertheless intercepting fruit which might land with considerable velocity on the conveyor itself. The cushions 126 and 127 are appropriately supported at their opposite ends on the subframe 61 straddling the conveyor belt. Whatever falls and rolls onto the conveyor is generally first intercepted by some energy-absorbing means. Thus the fruit being harvested is received uninjured.

Preferably the mesh of the conveyor belt 121 is of a size so that small, cull fruit passes through the mesh, while large, acceptable fruit is retained thereon. Fruit that falls through the mesh is directed to discharge onto the ground through side openings 128 in the subframe by dihedral deflector panels 129 and 131. These are high in the center close to the belt upper run and are low along the sides, so that undersized fruit passing through the conveyor belt is discharged immediately onto the ground without further handling.

Fruit that is too large to pass through the mesh conveyor belt is carried over the drum 123 and is discharged then through a guiding throat 132 conveniently of rubber-like material and extending generally inwardly and downwardly. The throat 132 is of sufficient extent so that in any position of the subframe 61, either retracted or extended, the throat overlies the substantially horizontal portion 133 of an elevating conveyor 134. This has cleats thereon at suitable intervals. The elevating conveyor 134 is on a frame forming part of the main frame of the machine and at its outboard end carries a drum 136 around which the lifting conveyor is trained. The conveyor is likewise carried around an idler drum 137 at the inboard end and is also passed around guide rollers 138 inboard of the main frame and around a hydraulically driven discharge drum 139 thereon. A guide drum 141 as well as guide ways 142 complete the constraint for the elevating conveyor.

As particularly shown in FIG. 4, there are two such elevating conveyors, each one underlying the respective one of the subframes 61 and 62 and each one being capable of receiving fruit from the adjacent one of the two subframe conveyor belts 121 in any position thereof. Fruit discharged onto the upper run of the elevating conveyors 133 travels toward the main frame of the machine and is lifted at a relatively steep incline, as shown in FIG. 6, onto the upper, substantially horizontal run of the elevating conveyor and is then discharged over the discharge drums 139.

The two discharge drums 139 are symmetrically disposed each one over one of a pair of longitudinal conveyors 143 and 144 which are duplicates of each other. Each of the conveyors runs around a drum 146 at one end and a drum 147 at the other end, one of the drums being hydraulically driven, so that the upper runs of the longitudinal conveyors travel toward the center of the machine. Fruit from the elevating conveyors is thus carried toward the machine center by the longitudinal conveyors 143 and 144 and is discharged over the adjacent ends thereof. During such discharge, leaves, debris and any contaminating light material is blown away by air jets emanating from ducts 148 supplied through flexible tubing 149 from a blower 151 driven by a hydraulic motor 152.

Particularly pursuant to the invention, fruit discharged from the conveyors 143 and 144 is received in a bulk bin of the usual sort, shown by broken lines 153 in FIG. 6. Bulk bins, as usually furnished, are provided with a solid bottom and four solid sides, but are open completely at the top. They are standard items widely utilized in the harvesting of fruit. They are normally distributed empty in the orchard in advance of the harvesting machines and are so oriented and positioned that they are available for pick up from the ground.

In the present instance, as the carriage 6 advances and approaches a bulk bin 153, the operator lowers the front end of the framework by exhausting hydraulic liquid from the cylinder 11 until such time as pick up frame booms 159 and 161 substantially contact the ground at their forward ends. These are provided with spade-like ramps 162. Each of the booms is like the other, and each includes at its forward end a sprocket 163 over which is trained a pick up chain 164 having lugs thereon at intervals. The chain 164 is disposed over guide sprockets 166 as well as driving sprockets 167, the latter being driven by a suitable hydraulic motor, not shown. The chain lower run returns from the sprockets 167 along the pick up frame booms and around a lower guide 168 to the sprocket 163.

When the forward end of the framework is dipped, the chains 164 are energized so that their upper runs move rearwardly. As a bulk bin is encountered by the advancing carriage on the ground in the orchard, the spades 162 engage under it and tip and lift it slightly until such time as the bulk bin rests upon and is impelled rearwardly by the chains 164. The bulk bin is thus taken aboard the carriage. Thereupon the jack 11 is again supplied with hydraulic liquid so that the main frame is restored substantially to horizontal position. The lug box moves rearwardly along the chain 164 and beneath the conveyor 143 until such time as it comes to a bulk bin station 171. At the bulk bin station, as particularly shown in FIGS. 13 and 14, there is provided a particular mechanism for supporting the bulk bin in a position directly beneath the two discharging ends of the conveyors 143 and 144.

Figure 13:
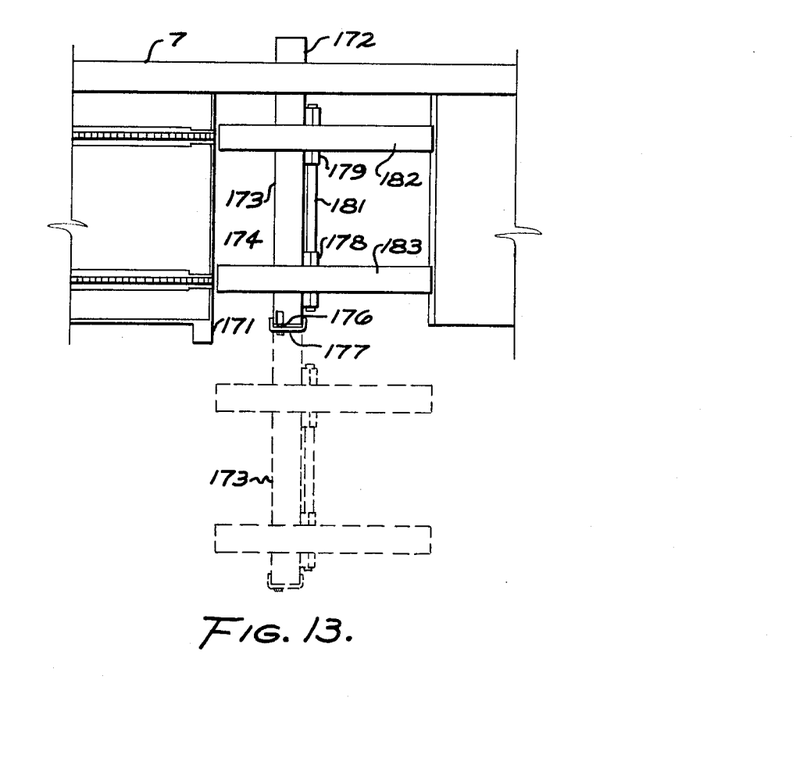
FIG. 13 is a plan of a part of the main frame including the bulk bin supporting mechanism, various parts being omitted for clarity.

Extending under the backbone of the main frame 7 is a suitably supported, transversely extending beam 172 or channel cantilevered from a point on the opposite side of the backbone of the main frame from the station 171. Resting on the beam 172 is a support channel 173 slidable with respect to the beam 172 under the influence of a hydraulic cylinder 174 fixed relative to the beam 172 and containing a piston rod 176 secured to a cap 177 fast on the end of the channel 173. When the piston rod 176 is within the cylinder 174 as controlled by the operator, the channel 173 is in retracted position as shown in FIG. 13 by solid lines. When the cylinder 174 is given hydraulic fluid and the piston rod 176 is projected, then the channel 173 is moved into the dotted line position shown in FIG. 13, being entirely cantilevered from the main frame and extending outboard of the main frame.

To take advantage of this motion, there is mounted on one side of the channel 173 a pair of journal straps 178 and 179 in which a rod 181 is rotatable. The rod carries a couple of beams 182 and 183. These are not symmetrical fore and aft but are longer on the rearwardly extending portions thereof than they are on the forwardly extending portions thereof measured from the axis of the rod 181. The beams are thus unbalanced and would normally tend to drop with their rearward ends lowermost, except that coil springs 184 are hooked at one end to the channel 173 and at the other end are provided with adjustable attachments 186 to the leading end of the beams 182 and 183. The beams are thus normally kept in a substantially horizontal position, despite their eccentric weight. Also, their rearward ends ride lightly on a lip 187 fastened onto the main frame 7.

When retracted and unloaded the beams 182 and 183 are in substantially horizontal alignment with the discharge end of the booms 159 and 161 and with the chains 164. A bulk bin being moved rearwardly by the chains comes to rest upon the beams 182 and 183 asymmetrically with the rod 181 but being retained in a horizontal position by the lip 187. The empty bin is in position to be filled.

Figure 14:
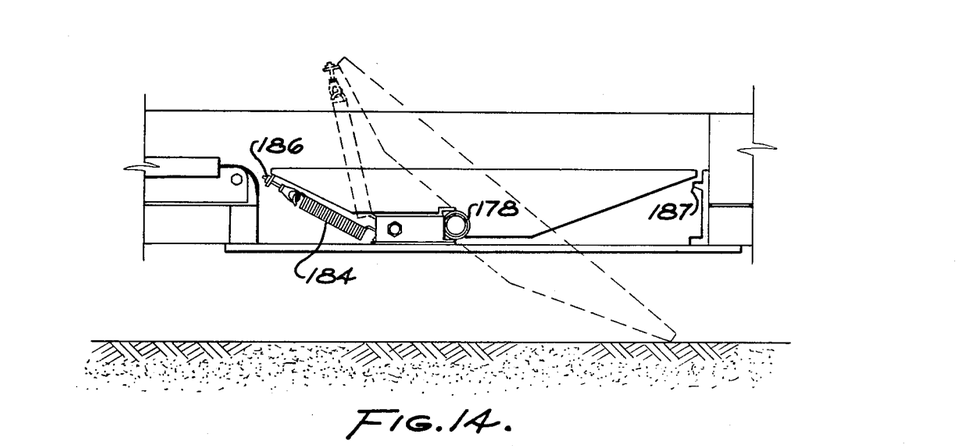
FIG. 14 is a side elevation of the main frame and bulk bin supporting mechanism to a larger scale than shown in FIG. 13.

When the bin has been substantially filled with fruit from the discharge end of the conveyors 143 and 144, the bin is available for discharge. At that point the operator supplies hydraulic fluid to the cylinder 174, which then projects the piston rod 176 and thus moves the channel 173 laterally out to the position shown by dotted lines in FIG. 13, a position outboard of the carriage. As soon as the end of the bulk bin clears the lip 187, the eccentric loading of the full bulk bin is sufficient to overcome the restraint of the springs 184. The beams 182 and 183 tilt around the rod 181, as shown in FIG. 14, into a tilted position engaging the ground, as shown by dotted lines therein. The bulk bin discharges onto the ground and levels itself as the carriage advances. Meanwhile, of course, a new bulk bin has been loaded and is put into position at the bulk bin station as previously described.

The bulk bin pick up and discharge are arranged to occur as the carriage is advancing from one tree to the next, so that there is always a bulk bin on board the carriage available to receive the fruit harvested from an individual tree or trees. If necessary, in effectuating the pick up or discharge of the bulk bin, the elevating mechanisms both at the front wheel and at the rear wheels can be maneuvered so that the pick up operation and the discharge operation are accomplished easily and smoothly. Otherwise, the main frame is sustained substantially at a horizontal attitude and at a selected height from the ground compatible with adequate ground clearance and also with overhead clearance from tree branches and depending fruit.

Whenever the crop of fruit has been shaken from the tree and is on its way to be received in the bulk bin, the operator can promptly retract the arm 58 of the tree shaker. At the same time he can begin to retract the wings from their extended position even though some fruit is still on them. As the wings are initially folded, fruit can still travel down them onto the conveyor belts 121 on the subframes and even as the operator moves the subframes from their extended position toward their retracted position. There is always a continuous path from the intercepting means clear through to the elevating conveyors in all positions of the wing and subframe structure. This saves considerable time in the harvest as it is not necessary to clear all the fruit before retracting the device for movement to the next tree.

When the wings have been substantially retracted and the subframes have been moved into their stowed positions, as shown particularly in FIG. 1, and the hook 58 of the shaking mechanism has been disengaged with the tree and swung inwardly, the operator then by appropriate steering motion (usually of both the front wheel and the rear wheels) slews the machine away from the tree trunk and then straightens it and guides it in the direction of the arrow toward the next tree to be picked. Thereat the machine is again slewed toward the adjacent tree trunk until it is possible to engage the shaker therewith. At that time the hook is again extended and pulls the shaking mechanism into engagement with the tree trunk. The wings and subframes are again extended, and the operation is repeated.

What is claimed is:

1. A harvesting machine especially for tree fruit comprising a carriage having a main frame and adapted to advance in a predetermined direction, means for moving said carriage to dispose said main frame alongside the trunk of a tree, a subframe having a major axis, means for mounting said subframe on said main frame to move between a retracted position with said major axis substantially parallel to said main frame and a projected position with said major axis substantially normal to said main frame, means for moving said subframe between said retracted and projected positions, a catching wing, means including a wing support mounted on said subframe and engaging said catching wing, and means for moving said wing support between an initial position and an extended position.

2. A machine as in claim 1 in which said wing support when in extended position is inclined downwardly toward said tree trunk.

3. A machine as in claim 1 in which said wing support is mounted on said subframe for rotation about a vertical axis.

4. A machine as in claim 1 in which said catching wing is of flexible material.

5. A machine as in claim 1 including two of said wing supports and in which said catching wing is connected to transmit tension between said wing supports.

6. A machine as in claim 1 including means on said main frame for engaging and shaking said tree trunk.

7. A machine as in claim 1 including a pair of subframes movable to positions alongside opposite sides of said tree trunk.

8. A machine as in claim 7 including means for pivoting said subframes on said main frame to turn about vertical axes on opposite sides of said shaking means.

9. A machine as in claim 1 including means on said main frame for supporting a bulk bin at a station.

10. A machine as in claim 9 including means for conveying a bulk bin from the ground in front of said carriage to said bulk bin station on said main frame.

11. A machine as in claim 9 in which said bulk bin supporting means is an unbalanced platform.

12. A machine as in claim 11 in which said platform is urged to bin-supporting position by a spring.

13. A machine as in claim 11 including means for moving said platform on said carriage between an inboard receiving position and an outboard discharging position.

14. A machine as in claim 9 including means for conveying fruit from said subframe to said bulk bin station.

15. A machine as in claim 14 in which said conveying means includes a catching conveyor on said subframe and an elevating conveyor on said main frame.

16. A machine as in claim 15 including cushions arranged over and around said catching conveyor.

17. A machine as in claim 15 in which said catching conveyor is disposed to discharge to said elevating conveyor in all positions of said subframe.

18. A machine as in claim 15 in which said catching conveyor is a mesh belt through which small fruit only may pass.

19. A machine as in claim 18 including means on said subframe for diverting to the ground small fruit passing through said mesh belt.

20. A machine as in claim 1 including a catching panel overlying said main frame and inclined downwardly toward said tree trunk.

21. A machine as in claim 20 including a catching deflector interposed between said catching panel and said catching wing.

22. A machine as in claim 21 in which said catching deflector is inclined downwardly toward said tree trunk.

23. A machine as in claim 21 including a hinge connecting said catching deflector to said catching panel.

24. A machine as in claim 23 including means for moving said catching deflector about said hinge upon movement of said subframe between said retracted position and said projected position.

25. A machine as in claim 24 in which said moving means includes a cam and a follower.

26. A machine as in claim 1 including rear wheel means supporting the rear of said carriage, front wheel means supporting the front of said carriage, means for raising and lowering the rear of said carriage with respect to said rear wheel means, and means for raising and lowering the front of said carriage with respect to said front wheel means.

27. A machine as in claim 26 including means for individually steering said front wheel means and said rear wheel means.

28. A machine as in claim 26 in which said front wheel means includes a single wheel supporting a plunger reciprocable and rotatable in a cylinder on said main frame.

29. A machine as in claim 28 including means for rotating said plunger in said cylinder, and means for reciprocating said plunger in said cylinder.

* * * * *